United States Patent [19]

Iwasaki et al.

[11] 4,046,004
[45] Sept. 6, 1977

[54] DIESEL ENGINE DIAGNOSING DEVICE

[75] Inventors: Yuji Iwasaki, Kawagoe; Koichi Kashima, Higashimatsuyama, both of Japan

[73] Assignee: Diesel Kiki Co., Ltd., Tokyo, Japan

[21] Appl. No.: 736,349

[22] Filed: Oct. 27, 1976

[30] Foreign Application Priority Data

Oct. 29, 1975  Japan ................ 50-129345

[51] Int. Cl.$^2$ ............................................. G01F 9/00
[52] U.S. Cl. ............................................. 73/119 A
[58] Field of Search .................. 73/119 A, 117.3; 324/16 T

[56] References Cited

U.S. PATENT DOCUMENTS

| 3,344,663 | 10/1967 | Dreisin | 73/119 A |
| 3,732,492 | 5/1973 | Geul | 73/119 A X |
| 3,978,721 | 9/1976 | Clark et al. | 73/119 A |

*Primary Examiner*—Jerry W. Myracle
*Attorney, Agent, or Firm*—Cushman, Darby & Cushman

[57] ABSTRACT

A Diesel engine diagnosing device, particularly, a device for diagnosing the timing of a fuel injection is disclosed. The device according to the present invention comprises a transducer to convert the injection pressures into an electrical signal, a first pulse generator to produce a first pulses of a predetermined pulse width, the first pulses being produced at the moment of a building up of the primary injection pressures, and a second pulse generator to produce second pulses which are generated when triggered by the leading edges of said first pulses and which can be set for a desired mark-space ratio. And, a first marking provided on the stationary part of the engine and second marking provided on the rotary part of the engine are lighted by an electronic flash emitter which flashes as triggered with the trailing edge of said second pulses.

The device further has an injection timing indicator which displays the integral value of the output signal produced from said second pulse generator. Thus, the injection timing of the engine can be known by adjusting the mark-space ratio of the second pulses for establishing the first marking and the second marking in a positional relationship and for reading the indication on the indicator.

5 Claims, 5 Drawing Figures

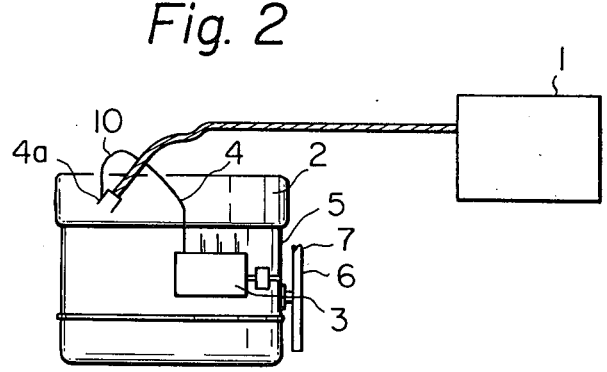
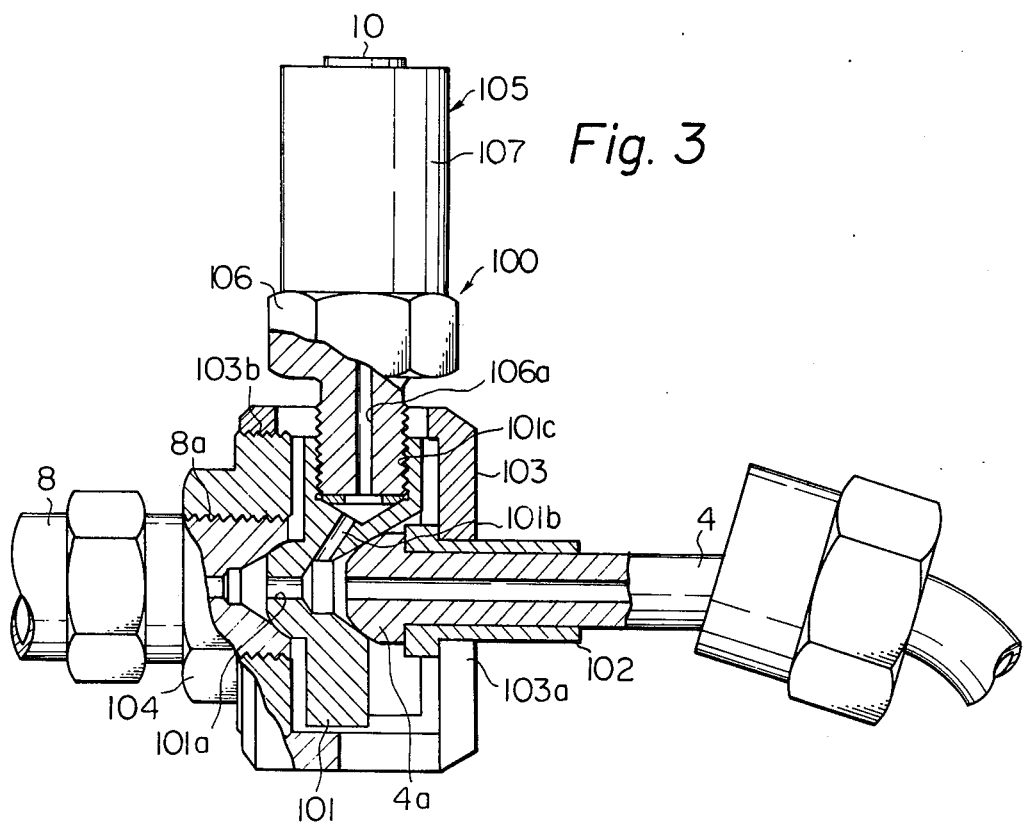

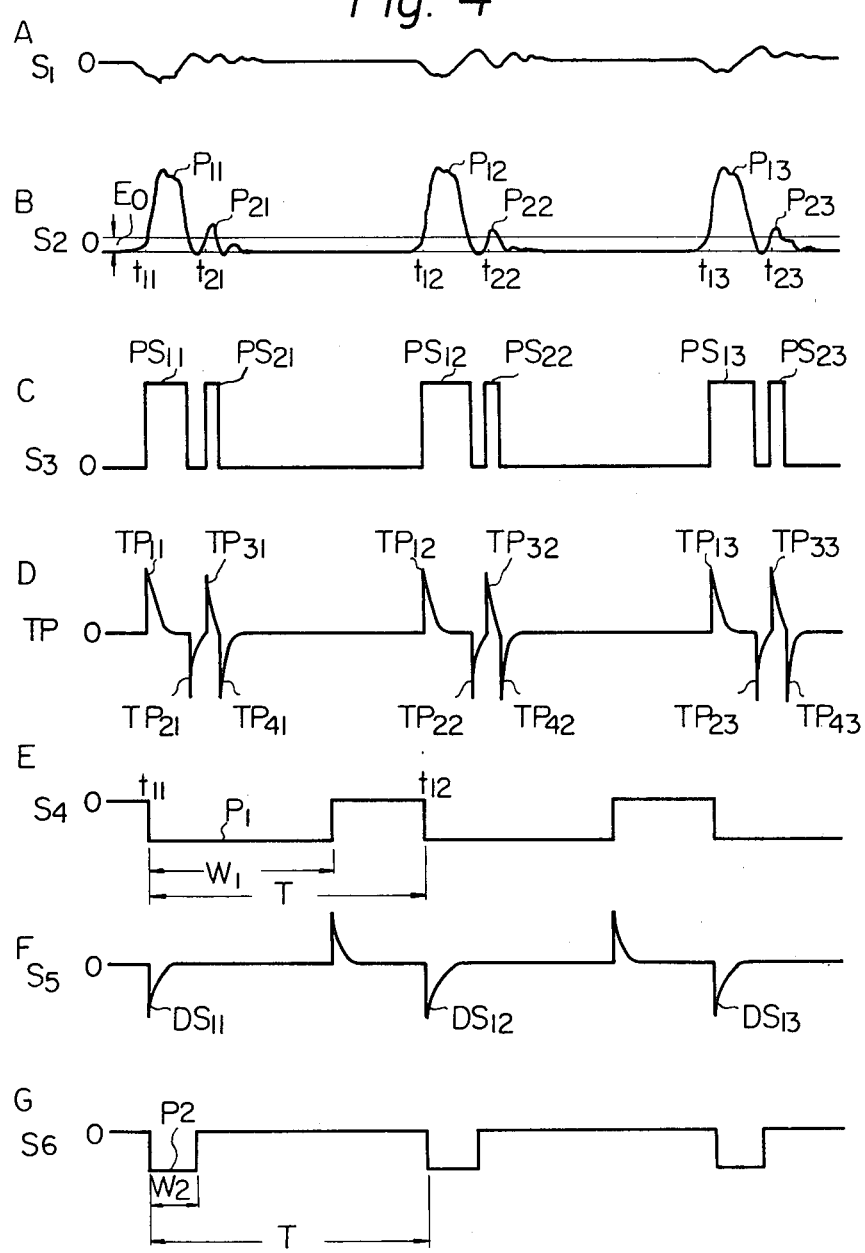

4,046,004

DIESEL ENGINE DIAGNOSING DEVICE

BACKGROUND OF THE INVENTION

The present invention relates to a Diesel engine diagnosing device for use in the diagnosis of the operation, and more particularly, in the fuel injection timing of a Diesel engine.

Generally, prior to the examination of a Diesel engine, the fuel injection pump must be disassembled from the Diesel engine body, and the engine body and fuel injection pump must be separately and statically examined by using exclusive examining units. In further detail, the fuel injection pump is usually mounted on to a pump tester equipped with a motor which is used to rotate the fuel injection pump. Various characteristics such as the injection timing, injected fuel amount, etc., of the pump are examined by the pump tester. On the other hand, the engine body is examined only for its operation by using a separate engine tester. In order to known well the status of a Diesel engine, however, it is desirable for various dynamic operations of the engine to be examined under the condition where the Diesel engine body and the fuel injection pump are assembled together. To this end, a timing device, for example, disclosed in the Japanese Patent Publication No. Sho-47-29621, is used. Because such a timing device requires an electrical signal corresponding to the change of injection pressure occurring in the fuel injection system of a Diesel engine, and a top dead center signal representative of the top dead center position of said engine, the construction of a prior-art device of this type becomes very complex. Moreover, it is difficult for the prior-art device to provide an accurate measurement because the signal occurring due to the secondary injection pressure and/or the change of the number of revolutions of the engine tends to cause erroneous measurements.

SUMMARY OF THE INVENTION

Accordingly, the primary object of the present invention is to provide an improved Diesel engine diagnosing device.

Another object of the present invention exists in providing a Diesel engine diagnosing device by which it is possible to know the fuel injection timing of a Diesel engine from only the change of injection pressure occurring in the fuel injection system of the Diesel engine.

Still another object of the present invention is to provide a Diesel engine diagnosing device which makes it possible to use injection pressures (e.g., secondary injection pressure, reflected pressure, etc.) other than the primary injection pressure, occurring in the fuel injection system of the engine, in order to prevent any faulty operation from taking place.

A further object of the present invention is to provide a Diesel engine diagnosing device which makes it possible to accurately know the fuel injection timing irrespective of the change of the Diesel engine speed.

To attain the above-mentioned objects, the Diesel engine diagnosing device comprises, according to the present invention, a transducer to convert the time-change of an injection pressure occurring in the fuel injection system of a Diesel engine into an electrical signal; a first pulse generator to produce first pulses which are generated so as to have a predetermined duration when the primary components of the output electrical signal from said transducer build up; a second pulse generator to produce second pulses which are generated when triggered by the leading edges of said first pulses and which can be set for a desired mark-space ratio; and an electronic flash emitter which flashes when triggered by the trailing edges of said second pulses. In addition, the device according to the present invention may advantageously include a first marking provided on the stationary part of said Diesel engine; a second marking provided on the rotary part of said engine so that said second marking is in an angular position which coincides with the angular position of said first marking when the crank shaft of the Diesel engine is in a predetermined angular position; and an injection timing indicator which displays the integral value of the output signal from said second pulse generator, thereby making it possible to know a fuel injection timing of the Diesel engine from the integral value which is displayed on the injection timing indicator when the mark-space ratio of said second pulses are so adjusted for the first and second markings to be possibly viewed in a predetermined positional relationship to each other at the time said electronic flash emitter is operating to flash.

The duration of each of the first pulses is preferably set to be longer than the period from the building-up time of the primary injection pressure until the level of the pressures caused by the injection pressure components other than the primary injection pressures is reduced to a level lower than the predetermined level. By setting the pulse duration in this manner, it is possible to completely eliminate any measuring error due to the injection pressures following the secondary injection pressure.

In a preferred embodiment according to the present invention, said second pulse generator is provided with a correcting circuit to change the duration of each of said second pulses according to the number of revolutions of the Diesel engine in order to maintain constant the mark-space ratio of the second pulses independently of the increase or decrease of the number of revolutions of the engine. The provision of such a correcting circuit makes it possible to directly read the value displayed on the injection timing indicator, thus eliminating the necessity for any further corrections.

The above and further objects and novel features of the present invention will be more fully apparent from the following detailed description when the same is read in connection with the accompanying drawings. It is to be expressly understood, however, that the drawings are for the purposes of illustration only and are not intended to be a definition of the limites of the present invention.

BRIEF DESCRIPTION OF THE DRAWINGS

FIG. 2 shows a schematic perspective view explaining the installation of the transducer in FIG. 1 at the time of examining a Diesel engine with the device according to the present invention;

FIG. 3 is a partial sectional view, at a larger scale, of the junction of the transducer in FIG. 2;

Figure 1:
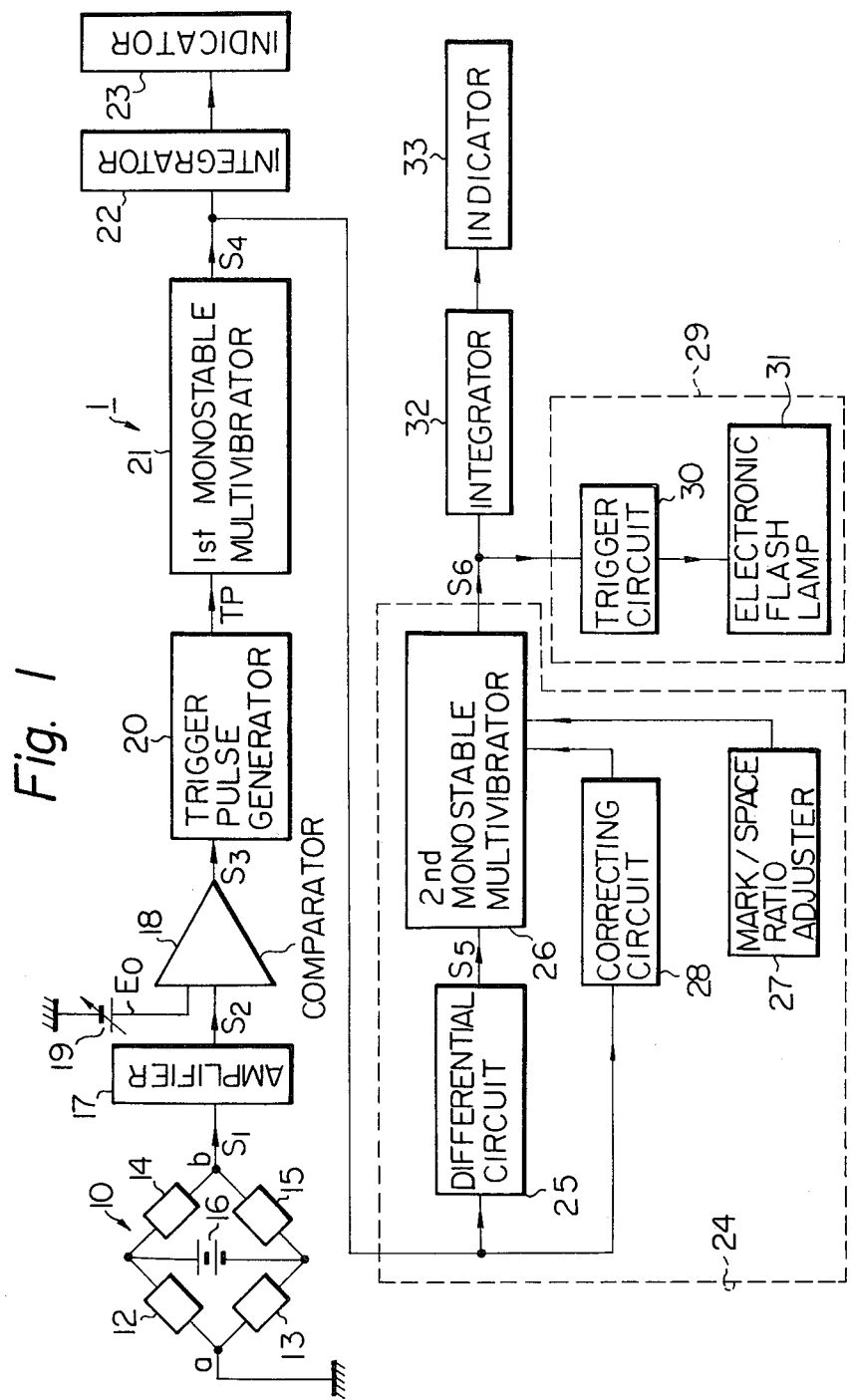
FIG. 1 is a block diagram of an embodiment constructed according to the present invention.
Figure 5:
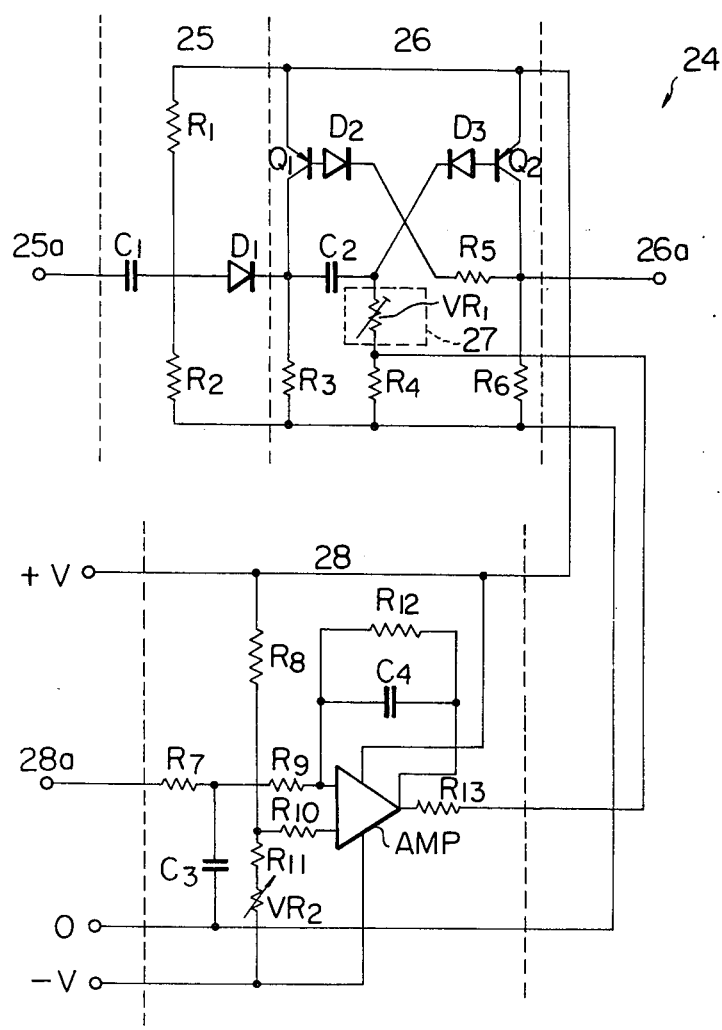

Diagrams A through G of FIG. 4 show waveforms produced in the device illustrated in FIG. 1, and;

FIG. 5 is a circuit diagram of the second pulse generator in FIG. 1.

DETAILED EXPLANATION OF THE INVENTION

Referring now to FIG. 1, the Diesel engine diagnosing device 1 according to the present invention is shown in the block form. The device 1 is provided with a transducer 10 which converts the change of injection pressure occurring in a fuel injection system of the Diesel engine into an electrical signal. Said transducer 10 is a resistance-wire strain gauge comprising four resistance wires 12 to 15 combined into a bridge circuit. A DC power source 16 is connected between the opposite connecting points in one pair of the bridge circuit so that a signal voltage depending on the strain of each resistance wire may be obtained between the terminals $a$ and $b$. As illustrated in FIG. 2, a Diesel engine body 2 has installed thereto a fuel injection pump 3 carrying an injection pipe 4. The transducer 10 is installed to the connection between an injection nozzle 4a of said injection pipe 4 and a fuel pipe 8 (shown in FIG. 3) of the cylinder so that a slight strain change occurring in the injection pipe 4 due to the change of injection pressure at the time of the fuel injection may be converted into an electrical signal.

FIG. 3 partially illustrates, at a larger scale, a sectional view of the installation of the transducer 10. The injection nozzle 4a at the end of the injection pipe 4 and the fuel pipe 8 are connected together by means of an injection pressure detecting assembly 100. This assembly 100 includes an injection pressure leadout block 101 having a passage 101a formed between the open ends of said nozzle 4a and fuel pipe 8 for communication between both said open ends; a housing 103 cut at 103a in a U-shape, this cut portion 103a engaging a flanged sleeve 102 being mounted around the injection nozzle 4a; and a nut 104 screwed into a threaded recess 103b formed in the inner wall at one end of the housing 103 and onto a threaded recess 8a formed in the fuel pipe 8 along the outer circumference thereof. With said housing 103 and nut 104, the open ends of the nozzle 4a and fuel pipe 8 are liquid-tightly engaged as pressure-fitted against both the open ends of the passage 101a, respectively. The injection pressure leadout block 101 has further formed therein a screw hole 101c communicating with the passage 101a through a passage 101b, said screw hole 101c having screwed therein a member 105 operative in response to a pressure. This pressure-responsive member 105 consists of a bolt-like screwed-in piece 106 and a pressure receiving hollow cylinder 107 provided on the head thereof. There is provided in the center of said screwed-in piece 106 a passage 106a through which the pressure receiving hollow cylinder 107 can communicate with said passage 101b. As shown in FIG. 3, the transducer 10 which serves as a strain gauge is fixed to the head of the pressure receiving hollow cylinder 107. Thus, a pressure for the fuel injection will be fed through the passage 101b, screw hole 101c and the passage 101a to the pressure receiving hollow cylinder 107. Then, the cylinder 107 is subject to a distortion corresponding to the injection pressure, and then an electrical signal corresponding to that injection pressure can be obtained from the transducer 10.

Referring here again to FIG. 1, an electrical signal $S_1$ thus derived from the transducer 10 is amplified through an amplifier 17 to a predetermined level. The output from said amplifier 17 is applied as an injection pressure signal $S_2$ to the non-inverting input terminal of a comparator 18. It should be noted that in the example shown in FIG. 1, the signal $S_1$ is amplified for phase reversal by the amplifier 17. A DC voltage $E_o$ produced at a predetermined level, from a variable DC power source 19 is applied to the inverting input terminal of said comparator 18. Said signal $S_2$ is subject to a comparison with this signal voltage $E_o$, and the portion of the signal $S_2$ which is at a level higher than the voltage $E_o$, is amplified for saturation and formed into a pulse signal $S_3$.

Diagrams A through C of FIG. 4 are waveform diagrams showing the operational process just referred to above. As seen from FIG. 4, each of the injection pressures $P_{11}$, $P_{12}$, ... due to the primary injections is followed, at each fuel injection, by each of the injection pressures $P_{21}$, $P_{22}$, ... due to the secondary injection. Corresponding to the signals produced by respective injection pressures are derived pulse signals $PS_{11}$, $PS_{12}$, ..., $PS_{21}$, $PS_{22}$, ... Those concerned in the art will be able to readily understand from the aforementioned explanation that the waveforms of the injection pressures can be observable in detail by means of an oscilloscope connected to the output of the amplifier 17 shown in FIG. 1.

As each of the building-up time $t_{11}$, $t_{12}$, ..., $t_{21}$, $t_{22}$, ... of the injection pressure shown in FIG. 4B, the pulse signal $S_3$ is supplied as an input to a trigger pulse generator 20 which produces a trigger pulse signal. This trigger pulse generator 20 comprises a differential circuit which delivers trigger pulse signal TP, as shown in FIG. 4D, including positive and negative trigger pulses $TP_{11}$, $TP_{21}$, ... each of a short duration corresponding to the moments of building-up and the falling times of each of the pulse signals $PS_{11}$, $PS_{12}$, ... $PS_{21}$, $PS_{22}$, ... Here, the building-up time of the injection pressure is defined to be the time at which each of the injection pressure signals shown in FIG. 4B is larger than the DC voltage $E_o$. Accordingly, the times $t_{11}$, $t_{21}$, $t_{12}$, ... will change depending on the manner of setting the value of the variable DC voltage source 19. However, no problem occurs since each of the primary injection pressure $P_{11}$, $P_{12}$, ... builds up sharply. The trigger pulse signal TP is supplied to the trigger input terminal of a monostable multivibrator 21. This monostable multivibrator 21 is so designed to be triggered by the trigger pulses $TP_{11}$, $TP_{12}$, ... $TP_{1n}$ generated at the time of the primary injection pressures $P_{11}$, $P_{12}$, ... building-up, namely, at the times of $t_{11}$, $t_{12}$, ... $t_{1n}$ to generate a pulse $P_1$ of a predetermined duration $W_{1n}$. For the monostable multivibrator 21 not to be triggered by trigger pulses produced due to the secondary and tertiary injections, the above-mentioned duration $W_1$ of the pulse $P_1$ is set to be longer than the time period from the building-up of the primary injection pressures until when the secondary and tertiary injections occur. Thus, the pulses $P_1$ produced when the multivibrator 21 is triggered at the time of the primary injection pulse building-up, are continuously delivered for the time period, for example, during which trigger pulses $TP_{31}$, $TP_{32}$, ... are being developed. These trigger pulses $TP_{31}$, $TP_{32}$, ... will not cause any faulty operation. The output signal derived through the monostable multivibrator 21 has the duration $W_1$ being constant as shown in FIG. 4E. The time length T from the time $t_{11}$ to $t_{12}$ depends on the cycle of the primary injection pressure, say, the number of revolutions. Namely, the output signal $S_4$ includes information concerning the number of revolutions of the Diesel engine. The comparator 18, the trigger pulse generator 20 and the first monostable multivibrator 21 together form a first pulse generator to produce a first pulse which has a predetermined duration and is generated when the primary component of the electrical output signal from the transducer 10 builds up due to the first injection pressures of the injection pressures.

In order to indicate the number of revolutions by using the output signal $S_4$, the device 1 is provided with an integrator 22 and a meter-like indicator 23 which is used to indicate the output from said integrator 22. The output signal $S_4$ is integrated by the integrator 22 to provide an output voltage which changes correspondingly to the change of the time length T. The value of the output voltage is indicated on the indicator 23. Therefore, the number of revolutions can be directly read from the calibrations and gradings corresponding to such numbers of revolutions observed on the scale of the indicator 23.

The output signal $S_4$ is triggered by the leading edges of the pulses produced by the first monostable multivibrator 21, namely, at the times $t_{11}, t_{12}, \ldots t_{1n}$ to generate a pulse which is supplied as an input to the second pulse generator 24 by which the mark-space ratio of said pulse can be set to a desired one. Said second pulse generator 24 comprises a differential circuit 25 to differentiate the output signal $S_4$ and a second monostable multivibrator 26 which is triggered by a signal $S_5$ (FIG. 4F) differentiated by said differential circuit 25. Said second monostable multivibrator 26 is triggered by pulses $DS_{11}, DS_{12}, \ldots$ generated at the leading edges of the pulses of the differentiated pulse signals $S_5$ to generate a pulse $P_2$, the mark-space ratio $W_2/(T-W_2)$ of which is determined by the mark-space ratio adjuster 27 (FIG. 4G). It should be noted here that the reference numeral 28 indicates a correcting circuit which prevents the mark-space ratio from changing with respect to the change of the number of revolutions of the Diesel engine by automatically changing the pulse duration $W_2$ corresponding to the increase or decrease of the number of revolutions of the engine.

FIG. 5 illustrates a circuit diagram of the second pulse generator 24. The output signal $S_4$ transmitted from the terminal 25a is supplied as an input to the differential circuit 25 which consists, as shown in FIG. 5, of a capacitor $C_1$ and resistances $R_1$ and $R_2$, to generate a differential signal $S_5$. This differential signal $S_5$ is fed as a trigger signal to the collector of transistor $Q_1$ through a diode $D_1$. Said transistor $Q_1$ together with another transistor $Q_2$ forms a second monostable multivibrator 26. The collectors of both said transistors $Q_1$ and $Q_2$ are connected to the earth through resistances $R_3$ and $R_6$, respectively, the base of said transistor $Q_1$ being connected to the collector of the transistor $Q_2$ through a diode $D_2$ and resistance $R_5$. The base of the transistor $Q_2$ is connected to the collector of the transistor $Q_1$ through a diode $D_3$ and capacitor $C_2$. Between the junction of the diode $D_3$ to the capacitor $C_2$ and the earth is inserted a serial circuit consisting of a variable resistance $VR_1$ and a resistance $R_4$. The second monostable multivibrator 26 thus assembled will provide a pulse, the duration of which depends, as is well-known, on the values of the capacitor $C_2$, resistance $R_4$ and the variable resistance $VR_1$. This variable resistance $VR_1$ is provided for the mark-space ratio adjuster 27 to set the mark-space ratio $W_2/(T-W_2)$ to a desired one by appropriately setting the value of said variable resistance $VR_1$. On the other hand, the output signal $S_4$ is also supplied from the terminal 28a to the correcting circuit 28 in which the signal $S_4$ is first converted by the integrator circuit comprising a resistance $R_7$ and a capacitor $C_3$, into a DC voltage of a value proportional to the number of revolutions of the Diesel engine. The DC voltage is applied through an input resistance $R_9$ to one input terminal of a DC inverting amplifier AMP which may be formed by an arithmetic amplifier. To the other input terminal is connected a bias voltage produced by a bias circuit consisting of resistances $R_8$ and $R_{11}$ as well as a variable resistance $VR_2$, through an input resistance $R_{10}$. Further, said amplifier AMP has the output connected back to one input thereof through a parallel circuit formed with a resistance $R_{12}$ and a capacitor $C_4$. The output signal, namely, the DC voltage from the amplifier AMP changes in inverse proportion to the number of revolutions of the engine. This DC voltage is applied to the junction between the resistance $R_4$ and the variable resistance $VR_1$ of the second monostable multivibrator 26 by means of a resistance $R_{13}$. The voltage applied to this junction will decrease as the number of revolutions of the engine increases. Accordingly, when the cycle of a pulse signal $S_6$ developed at the terminal 26a of the second monostable multivibrator 26 becomes shorter due the increase in the number of revolutions, the duration $W_2$ of the pulse $P_2$ will then be shortened at the same rate without the variable resistance $VR_1$ being adjusted, and the mark-space ratio will be maintained constant. The symbol V indicates a positive power source, while $-V$ indicates a negative power source.

Referring here again to FIG. 1, the pulse signal $S_6$ is supplied to an electronic flash emitter 29 which is triggered with the trailing edge of the pulse $P_2$. This flash emitter 29 consists of a trigger circuit 30 which is formed by a differential circuit, for example, to create a trigger pulse by the trailing edge of the pulse $P_2$, and an electronic flash lamp 31 which is made to flash intermittently by a trigger pulse from said trigger circuit 30. As seen in the foregoing, the electronic flash lamp 31 will flash at each full rotation of the rotating shaft of the Diesel engine and at a position where the rotational shaft has been rotated by a rotational angle depending on the setting of the pulse duration adjuster from the fuel injecting time. It should be noted that there are provided an integrator 32 and indicator 33 which are similar in construction and operation to the integrator 22 and indicator 23, respectively, for indicating the magnitude of the mark-space ratio by using the pulse signal $S_6$. Thus, with the integrator 32 and the indicator 33, there is provided an indication of the rotational angle between the position of the rotating shaft at the moment of O the fuel injection and at the instant when the electronic flash lamp is being actuated. Referring to FIG. 2 to use the electronic flash lamp, actuated as described above, for knowing the injection timing of the Diesel engine, there is provided a first marking 5 on the casing, the stationary part of the engine, and a second marking 7 on a disk 6 secured to the engine shaft, the rotary part of the engine. The second marking 7 is so provided that it may be in an angular position which coincides with the angular position of said first marking 5 when the crankshaft of the Diesel engine is in a predetermined angular position. In the preferred embodiment, as described so far, both said markings are so arranged that the markings will coincide with each other in an angular position when the piston is in the top dead center position.

How to examine the fuel injection timing by means of the electronic flash lamp 31 and said both markings 5 and 7 will be described below. As already mentioned, when it is triggered with the pulse signal $S_6$, the electronic flash emitter 29 flashes once after every lapse of a time duration $W_2$ from the time of the fuel injection. The pulse $P_2$ occurs repeatedly at a rate of T which is equivalent to 720°, the rotational angle of the rotating shaft (for the case of a four-cycle engine). Accordingly, the pulse duration $W_2$ equals 720 × $W_2$/T (degrees) when the pulse duration is converted into a rotational angle of the shaft. Thus, it is possible to know the fuel injection timing if the mark-space ratio $W_2/(T - W_2)$ of the pulse $P_2$ is known when the mark-space ratio adjuster 27 is adjusted to alter the flashing timing of the electronic flash emitter 29 so that the flash emission from the electronic flash emitter 29 makes the first and second markings appear in a predetermined positional relation between them, namely, according to the illustrated example, both markings coincide with each other. Since the mark-space ratio $W_2/(T - W_2)$ is indicated on the indicator 33, converting the ratio into an angle and grading the angle on the scale will make it possible to readily known the progression of the fuel injection.

According to the present invention, the transducer has only to be installed to a Diesel engine in order to very easily examine the fuel injection, the number of revolutions and the fuel injection timing of the Diesel engine. Moreover, once the signal from the transducer has been converted into a pulse signal which is triggered by the first pulse generator at the time of the building up of the primary injection pressure thereby producing pulses of a predetermined duration, any reflected waves of pressure, secondary and tertiary injections occurring in the injection system will not cause a faulty operation of the device, thus assuring a high-precision measurement and examination.

What is claimed is:

1. A Diesel engine diagnosing device, comprising:
   a transducer to convert the time-change of an injection pressure occurring in the fuel injection system of a Diesel engine into an electrical signal;
   a first pulse generator to produce first pulses which are generated so as to have a predetermined duration when the primary components of the output electrical signal from said transducer build up;
   a second pulse generator to produce second pulses which are generated when triggered by the leading edges of said first pulses and which can be set for a desired mark-space ratio;
   an electronic flash emitter which flashes when triggered by the trailing edges of said second pulses;
   a first marking provided on the stationary part of said Diesel engine;
   a second marking provided on the rotary part of said engine so that said second marking is in an angular position which coincides with the angular position of said first marking when the crankshaft of the Diesel engine is in a predetermined angular position, and;
   an injection timing indicator which displays the integral value of the output signal from said second pulse generator.

2. A Diesel engine diagnosing device according to claim 1, wherein said first pulse generator comprises:
   a comparator which compares a signal level generated from said transducer with a predetermined reference level;
   a trigger pulse generator which differentiates the output signal produced from said comparator, and;
   a monostable multivibrator which is triggered by trigger pulses produced by said trigger pulse generator when said primary injection pressures build up.

3. A Diesel engine diagnosing device according to claim 2, wherein the duration of each of the first pulses is preferably set to be longer than the period from the moment of the building-up of the primary injection pressure until the level of a pressure caused by the injection pressure components other than the primary injection pressure contained in the output signal from the transducer is reduced to a level lower than said reference level.

4. A Diesel engine diagnosing device according to claim 1, wherein said second pulse generator comprises;
   a differential circuit which differentiates said first pulses;
   means for rectifying the output signal produced from said differential circuit;
   a monostable multivibrator which is triggered by said output signals, and;
   means for changing the mark-space ratio of the pulse signals produced from said monostable multivibrator.

5. A Diesel engine diagnosing device according to claim 4, wherein said first pulse generator further comprises:
   a correcting circuit which corrects the pulse width of the output pulses produced from said monostable multivibrator corresponding to the rotational speed of the engine so as to make the mark-space ratio of said second pulses constant without changing the rotational speed of the engine.

* * * * *